United States Patent [19]

Kimura

[11] Patent Number: 4,899,303
[45] Date of Patent: Feb. 6, 1990

[54] FAULT DETECTION SYSTEM FOR AN ARITHMETIC UNIT

[75] Inventor: Masayuki Kimura, Tokyo, Japan

[73] Assignee: NEC Corporation, Tokyo, Japan

[21] Appl. No.: 173,163

[22] Filed: Mar. 25, 1988

[30] Foreign Application Priority Data

Mar. 27, 1987 [JP] Japan .................................. 62-75653

[51] Int. Cl.⁴ ........................................... G06F 11/10
[52] U.S. Cl. .................................................. 364/739
[58] Field of Search .................... 364/737, 739; 371/68

[56] References Cited

U.S. PATENT DOCUMENTS

| | | | |
|---|---|---|---|
| 3,816,728 | 6/1974 | Chen et al. ........................... | 364/739 |
| 4,181,969 | 1/1980 | Smith, Jr. .............................. | 364/739 |
| 4,213,188 | 7/1980 | Smolko et al. ........................ | 364/739 |

*Primary Examiner*—Charles E. Atkinson
*Attorney, Agent, or Firm*—Foley & Lardner, Schwartz, Jeffery, Schwaab, Mack, Blumenthal & Evans

[57] ABSTRACT

A fault detection system for an arithmetic unit includes a shift-and-add type multiplier which is capable of both normal multiplication and division for calculating a quotient as a product of a dividend and an approximated reciprocal of a divisor, a modulo 3 emulator emulating the multiplier in modulo 3 arithmetic, a modulo 3 converter converting the multiplication result of the multiplier into a modulo 3 equivalent, an error detector comparing outputs from the modulo 3 converter and the modulo 3 emulator to detect a bit error, and a control unit. The control unit supplies, to the modulo 3 emulator and the modulo 3 converter, a control signal representing either a normal multiplication mode, a multiplication mode for calculating a product of a divisor and a reciprocal of the divisor, a multiplication mode for calculating a product of a dividend and a reciprocal of a divisor, or a multiplication mode for generating a partial quotient in a division process. The control unit also controls generation of modulo 3 equivalents in the modulo 3 emulator and the modulo 3 converter.

6 Claims, 1 Drawing Sheet

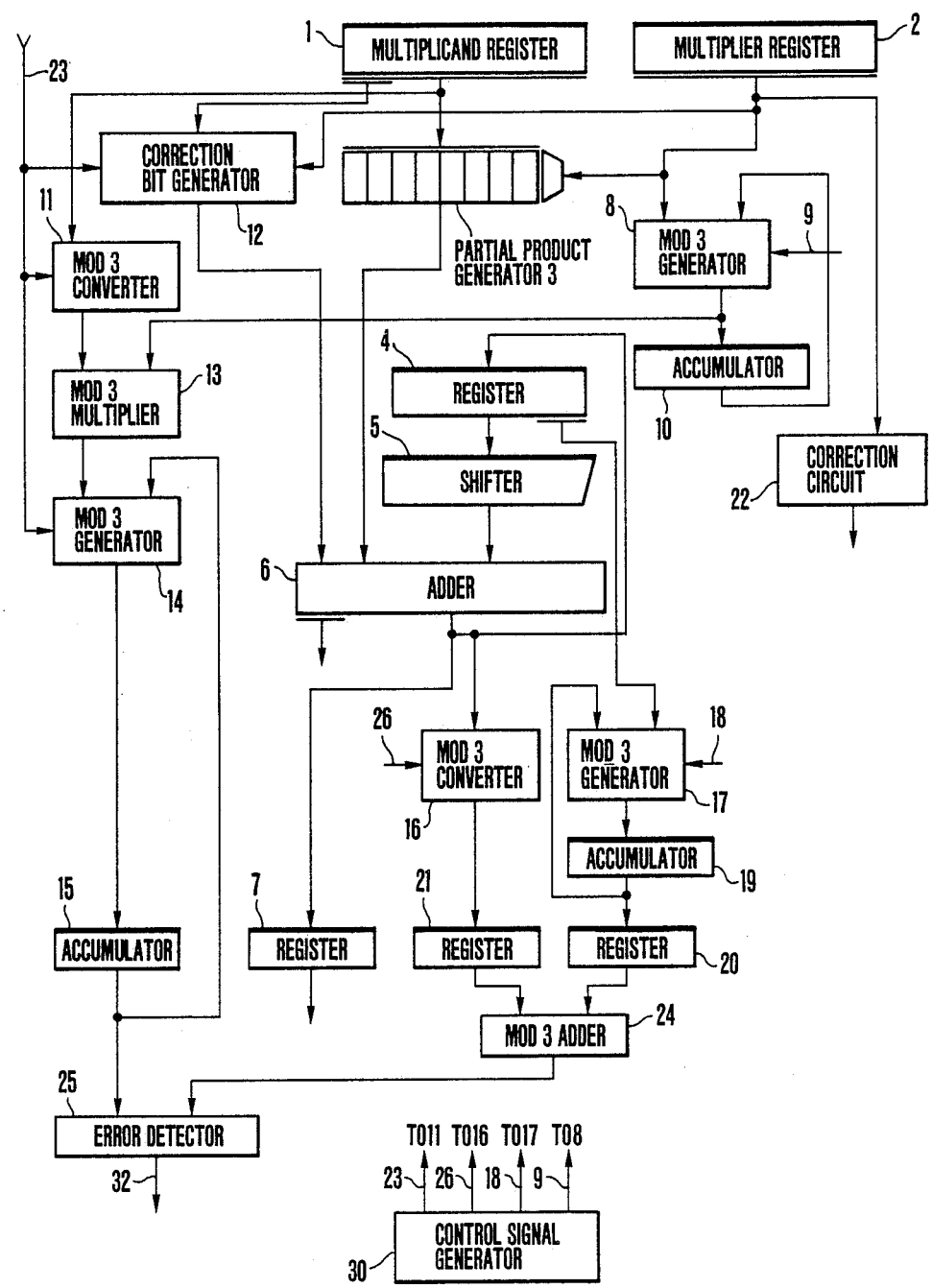

FAULT DETECTION SYSTEM FOR AN ARITHMETIC UNIT

BACKGROUND OF THE INVENTION

The present invention relates to a fault detection system for an arithmetic unit and, more particularly, to fault detection system for multiplier used for both a normal multiplication and a division for calculating a quotient as a product of a dividend and an approximated reciprocal of a divisor.

As a conventional fault detection system for a multiplier, a modulo 3 check system is often used. This system has an actual multiplier, and a modulo 3 emulator to emulate the multiplier in modulo 3 arithmetic. For identical multipliers and multiplicands, the modulo 3 equivalent of the multiplication result by the actual multiplier and the multiplication result of the modulo 3 emulator are compared, thereby detecting a bit error.

The modulo 3 equivalent of binary data can be easily calculated by storing a simple known conversion in a memory such as a ROM as a program.

However, in order to apply the above modulo 3 fault detection system to a multiplier used for both normal multiplication and division for calculating a quotient as a product of a dividend and an approximated reciprocal of a divisor, special-purpose circuits for checking during normal multiplication and division must be provided to the actual multiplier and the modulo 3 emulator, resulting in a complicated circuit arrangement and an increase in the number of hardware components.

SUMMARY OF THE INVENTION

It is an object of the present invention to provide a fault detection system which is free from the conventional drawbacks, and can be used for both normal multiplication and division with a simple circuit arrangement.

A fault detection system for an arithmetic unit according to the present invention comprises: a shift-and-add type multiplier which is used for both normal multiplication and division for calculating a quotient as a product of a dividend and a reciprocal of a divisor, modulo 3 emulator means for emulating the multiplier in a modulo 3 arithmetic, means for converting the multiplication result of the multiplier into a modulo 3 equivalent, means for comparing outputs from the means for converting the multiplication result into the modulo 3 equivalent and the modulo 3 emulator means to detect a bit error, and control means for supplying, to the modulo 3 emulator means and the means for converting the multiplication result into the modulo 3 equivalent, a control signal representing a multiplication mode in the multiplier such as a normal multiplication mode, a multiplication mode for calculating a product of a divisor and a reciprocal of the divisor, a multiplication mode for calculating a product of a dividend and a reciprocal of a divisor, or a multiplication mode for generating a partial quotient in a division process, and for controlling generation of modulo 3 equivalents in the modulo 3 emulator means and the means for converting the multiplication result into the modulo 3 equivalent.

BRIEF DESCRIPTION OF THE DRAWING

The drawing is a block diagram showing an embodiment of the present invention.

DETAILED DESCRIPTION OF THE PREFERRED EMBODIMENT

An embodiment of the present invention will be described with reference to the accompanying drawing.

The drawing is a block diagram showing an embodiment of the present invention.

The principle of the present invention will be described below.

An approximated reciprocal r of a divisor y is represented by equation (1) with the divisor y and precision $\delta$:

$$r = (1+\delta)/y \tag{1}$$

where the divisor y is binary normalized. In this case, if it is known that the precision $\delta$ is less than $2^{-9}$, a product $-y \cdot r$ (to be represented by $-D$ hereinafter) of the divisor y and the reciprocal of the divisor is represented by inequality (2):

$$-1 - 2^{-9} < -D < -1 + 2^{-9} \tag{2}$$

Alternatively, the product can be represented as equation (3) or (4):

$$-1 + 2^{-9} - 2^{-\infty} = 111.000000000111\cdots111 \tag{3}$$

$$-1 - 2^{-9} - 2^{-\infty} = 110.111111111000\cdots001 \tag{4}$$

Therefore, it is found that a value $-D \cdot 2^8$ obtained by shifting $-D$ to the left by 8 bits is represented as follows:

$$-D \cdot 2^8 = -y \cdot r \cdot 2^8 = (11\bar{e}eeeeee)eeeexxx\cdots \tag{5}$$

where $e = 0$ or 1. More specifically, the entire $-D$ can be estimated from the most significant bit (MSB) of 8-bit left-shifted $-D$.

A modulo 3 equivalent of 8-bit left-shifted $-D$ can be generated as follows. More specifically, as represented by equation (5), since 8-bit left-shifted $-D$ is:

$$(11\bar{e}eeeeee)eeeexxx\cdots$$

then, a modulo 3 equivalent MB is calculated as follows with respect to MA obtained by converting an output from an adder 6 or $-D$ set in a multiplicand register 1 into modulo 3 as a coded binary value:

If the weight of the MSB is "1", $$\begin{aligned} MB &= \mathrm{mod3}(MA + 1 + 1 + 2e + 8e) \\ &= \mathrm{mod3}(MA + 2 + 2(2e + 1) + 8e) \\ &= \mathrm{mod3}(MA + 1) \end{aligned} \tag{6}$$

If the weight of the MSB is "2", $$\begin{aligned} MB &= \mathrm{mod3}(MA + 2 + 2 + 7e + e) \\ &= \mathrm{mod3}(MA + 4 + 7e + 2e + 1) \\ &= \mathrm{mod3}(MA + 2) \end{aligned} \tag{7}$$

That is, $MB = \mathrm{mod3}(MA + \mathrm{constant})$.

In the drawing, reference numeral 1 denotes a multiplicand register for storing multiplicand; 2, a multiplier register for storing a partial multiplier; and 3, a partial product generator for calculating a product, i.e., a partial product, of a multiplicand supplied from the multiplicand register 1 and a partial multiplier supplied from the multiplier register 2. The partial product generated by the partial product generator 3 is output to the adder 6. The output from the adder 6 is supplied to a register 4. The content of the register 4 is output to a shifter 5. The shifter 5 is operated in one of three modes, i.e., zero-output mode, right-shift mode, left-shift mode. In the zero-output mode, it outputs zero, and in the right- and left-shift modes, it shifts the output from the register 4 to the right and left, respectively, and outputs the shifted result to the adder 6. The adder 6 adds the outputs from the partial product generator 3 and the shifter 5. More specifically, the register 4, shifter 5, and the adder 6 form a shift-and-add loop, and repeat a designated number of operations.

When the repetitive operations of the loop are completed, the content of the adder 6 is output to the register 4, a register 7, and a MOD3 converter 16. The MOD3 converter 16 is controlled by a control signal 26, and converts the output from the adder 6 into a modulo 3 equivalent. The converter 16 outputs the modulo 3 equivalent directly to a register 21 or adds it to a constant and outputs the sum to the register 21.

The register 4 is connected to a MOD3 generator 17 for generating lower bits which are shifted out by right shift of the shifter 5. The MOD3 generator 17 is controlled by a control signal 18. In a normal multiplication mode, the generator 17 outputs, to an accumulator 19, a modulo 3 equivalent of a sum of a modulo 3 equivalent of bits which are shifted out by the shifter 5 and an output from the accumulator 19. In a division mode, the generator 17 always outputs "0".

The output from the accumulator 19 is stored in a register 20. Modulo 3 data stored in the registers 20 and 21 are added by a MOD3 adder 24, and the sum is input to one input terminal of an error detector 25.

The output from the multiplier register 2 is also supplied to a MOD3 generator 8. The MOD3 generator 8 is controlled by a control signal 9. In a modulo 3 addition mode, the generator 8 adds the modulo 3 equivalent of the output from the multiplier register 2 and the content of a register 10, and outputs the sum to an accumulator 10; otherwise, the generator 8 converts the output from the multiplier register 2 into a modulo 3 equivalent and outputs it.

The output from the multiplicand register 1 is supplied to a MOD3 converter 11. The MOD3 converter 11 is controlled by a control signal 23. The converter 11 converts an input supplied from the multiplicand register 1 into a modulo 3 equivalent, and outputs it directly or adds it to a constant and outputs the sum to one input terminal of a MOD3 multiplier 13. The other input terminal of the MOD3 multiplier 13 receives the output from the MOD3 generator 8. The MOD3 multiplier 13 multiplies the two modulo 3 inputs, and supplies the product to one input terminal of a MOD3 generator 14. The MOD3 generator 14 is controlled by control signal 23, and outputs the modulo 3 equivalent of the output from the MOD3 multiplier 13, or adds it to the output from an accumulator 15 and outputs the sum to the accumulator 15. The output from the accumulator 15 is supplied to the other input terminal of an error detector 25. The error detector 25 compares the two inputs, and outputs an error detection signal 32 based on the comparison result.

The MSB of the multiplicand register 1 and the output from the multiplier register 2 are supplied to a correction bit generator 12. The generator 12 is controlled by the control signal 23. The generator 12 generates a correction bit to be added to a partial bit during a normal multiplication or division process based on the two inputs, and supplies the generated bit to the MSB of the adder 6. The output from the multiplier register 2 is connected to a correction circuit 22. A control signal generator 30 generates control signal 9, 18, 23 or 26 in accordance with an arithmetic mode, and supplies it to the corresponding circuit.

The operation of the circuit shown in the drawing will be described hereinafter (A) Normal Multiplication Mode In a normal multiplication mode, the control signal 23 for switching a mode is set in a multiplication mode. Thus, the correction bit generator 12 performs normal code expansion, the MOD3 converter 11 generates a modulo 3 equivalent of the output from the multiplicand register 1, and the MOD3 generator 14 directly outputs the output from the MOD3 multiplier 13. The MOD3 converter 16 converts the output from the adder 6 into a modulo 3 equivalent under the control of the control signal 26, and outputs it directly. The MOD3 generator 8 adds the output from the multiplier register 2 and the modulo 3 data from the register 10 in accordance with the control signal 9, and the MOD3 generator 17 adds the LSB shifted out by the shifter 5 and the output from the register 19 in accordance with the control signal 18.

An error detection operation is performed as follows.

(1) A multiplicand is set in the multiplicand register 1, and a first partial multiplier is set in the multiplier register 2. The shifter 5 is set in the zero-output mode and the registers 10 and 19 are cleared. A partial product generated by the partial product generator 3 and the output "0" from the shifter 5 are added by the adder 6.

(2) The output from the adder 6 is set in the register 4, and a next partial multiplier is set in the multiplier register 2. The output from the MOD3 generator 8 is set in the register 10, and the shifter 5 is set in the right-shift mode. The second partial product and the output from the shifter 5 are added by the adder 6.

(3) The output from the adder 6 is set in the register 4, and the next partial multiplier is set in the multiplier register 2. The output from the MOD3 generator 8 is set in the accumulator 10. The output from the MOD3 generator 17 is set in the accumulator 19. The partial product and the output from the shifter 5 are added by the adder 6.

(4) Item (3) is repeated a predetermined number of times.

(5) The output from the adder 6 is set in the register 7 as a final result. The outputs from the MOD3 generator 14, the MOD3 converter 16, and the accumulator 19 are respectively set in the registers 15, 21, and 20.

(6) The outputs from the registers 20 and 21 are added by the MOD3 adder 24, and the sum is supplied to the error detector 25. The output from the adder 24 is compared with the output from the register 15 by the error detector 25, thereby detecting a bit error.

(B) Division Mode

In the division mode, the MOD3 generator 17 outputs only "0" in accordance with the control signal 18. Therefore, since "0" is set in the accumulator 19 and the register 20, the MOD3 adder 24 directly outputs the output from the register 21.

(1) The control signal 23 for switching a mode is set in the normal multiplication mode, and the control signal 9 is set in the modulo 3 addition mode. The register 10 is cleared. A divisor y is set in the multiplicand register 1, and an approximated reciprocal −r of the divisor y is set in the multiplier register 2. The shifter 5 is set in the zero-output mode, and thereafter, a normal multiplication is performed.

(2) The output from the adder 6 is set in the register 4, and the output from the MOD3 generator 8 is set in the register 10. Thereafter, the multiplier register 2 is cleared, and the shifter 5 is set in the 8-bit left-shift mode.

(3) The output from the adder 6, i.e., 8-bit left-shifted −D, is set in the register 7. The output from the MOD3 generator 14 is set in the register 15, and the output from the MOD3 converter 16 is set in the register 21. In this case, the MOD3 converter 11 directly converts the output from the multiplicand register 1 into a modulo 3 equivalent, and the MOD3 generator 14 directly outputs the output from the MOD3 multiplier 13. The MOD3 converter 16 adds a constant to the modulo 3 equivalent of the output from the adder 6 to generate a new modulo 3 equivalent in accordance with the control signal 26.

(4) The outputs from the register 15 and the MOD3 adder 24 are checked by the error detector 25.

A dividend is set in the multiplicand register 1, and an approximated reciprocal r of a divisor is set in the multiplier register 2. After the shifter 5 is set in the zero-output mode, a normal multiplication is performed.

(5) The output from the MOD3 generator 14 is set in the register 15, and the output from the MOD3 converter 16 is set in the register 21. In this case, the MOD3 converter 11 directly outputs the modulo 3 equivalent of the output from the multiplicand register 1, and the MOD3 generator 8 directly outputs the modulo 3 equivalent of the output from the multiplier register 2 in accordance with the control signal 9. The MOD3 generator 14 directly outputs the output from the MOD3 multiplier 13, and the MOD3 converter 16 directly generates the modulo 3 equivalent of the output from the adder 6 in accordance with the control signal 26.

(6) The outputs from the register 15 and the MOD3 adder 24 are checked by the error detector 25.

The 8-bit left-shifted −D stored in the register is set in the multiplicand register 1, the MSBs of the output from the adder 6 are set in the multiplier register 2 as a partial product, and the entire output from the adder 6 is set in the register 4. The control signal 23 is set in a division loop mode to perform a multiplication in a division loop. The shifter 5 is set in the 8-bit left-shift mode. In this case, the correction bit generator 12 generates a correction bit for the shift-out data in the format of equation (5).

(7) The output from the MOD3 generator 14 is set in the register 15, and the output from the MOD3 converter 16 is set in the register 21. The partial product set in the multiplier register 2 is corrected by the correction circuit 22 in accordance with the output from the adder 6, and a corrected partial product is output. In this case, the MOD3 converter 11 adds a constant to the output from the multiplicand register 1 to generate a new modulo 3 equivalent. The MOD3 generator 14 outputs a sum of the output from the MOD3 multiplier 13 and the output from the register 15. The MOD3 generator 8 outputs only the modulo 3 equivalent of the output from the multiplier register 2 in accordance with the control signal 9. The MOD3 converter 16 generates a modulo 3 equivalent of the output from the adder 6 in accordance with the control signal 26.

Items (6) and (7) are repeated a predetermined number of times.

As described above, according to the present invention, when a quotient is calculated as a product of a dividend and an approximated reciprocal of a divisor, if a multiplier for a normal multiplication can be used, not only a data arithmetic unit but also a fault detection circuit can be commonly used. Thus, the number of hardware components can be reduced, and the circuit arrangement is simplified.

What is claimed is:

1. A fault detection system for an arithmetic unit, said fault detection system comprising:

a shift-and-add multiplier capable of both a normal multiplication and a division for calculating a quotient as a product of a dividend and a reciprocal of a divisor;

modulo 3 emulator means for emulating said multiplier in modulo 3 arithmetic;

conversion means for converting a multiplication result of said multiplier into a modulo 3 equivalent;

comparison means for comparing outputs from said conversion means and said modulo 3 emulator means to detect a bit error; and control means for supplying, to said modulo 3 emulator means and to said conversion means, a control signal representing at least one of a normal multiplication mode of said multiplier, a multiplication mode for calculating a product of a divisor and a reciprocal of said divisor, a multiplication mode for calculating a product of a dividend and a reciprocal of a divisor, and a multiplication mode for calculating a partial quotient in a division process, and for controlling generation of module 3 equivalents in said modulo 3 emulator means and said conversion means.

2. A system according to claim 1, wherein said modulo 3 emulator means includes generation means for generating a modulo 3 equivalent of a multiplicand, and when said control signal indicates said normal multiplication mode, said multiplication mode for calculating a product of a divisor and a reciprocal of said divisor, or said multiplication mode for calculating a product of a dividend and a reciprocal of a divisor, said generation means outputs said modulo 3 equivalent of said multiplicand, and, when said control signal indicates said multiplication mode for calculating a partial quotient in a division process, adds said modulo 3 equivalent of said multiplicand to a constant based on a precision of a reciprocal of a divisor and outputs a corresponding sum.

3. A system according to claim 1, wherein when said control signal indicates said normal multiplication mode, said multiplication mode for calculating a product of a dividend and a reciprocal of a divisor, or said multiplication mode for calculating a partial quotient in a division process, said conversion means directly generates a modulo 3 equivalent of an output from said multiplier, and, when said control signal indicates said multiplication mode for calculating a product of a divisor and a reciprocal of said divisor in a division process, adds a modulo 3 equivalent of an output from said multiplier to a constant determined by a precision of a reciprocal, and outputs a corresponding sum.

4. A fault detection system for a multiplier, said fault detection system which is used for both a normal multiplication and a multiplication during a division process in a data processing apparatus for generating a multi-bit partial quotient while executing a division as a product of a dividend and a reciprocal of a divisor using a module 3 check system, and which generates a predetermined number of partial products of multiplicands and multipliers and shifts and adds the partial products and the intermediate multiplication results to obtain a product of the multiplicands and the multipliers, comprising:

a first mode signal indicating that multiplication under execution in a data processing apparatus is either a normal multiplication, a multiplication for calculating a product of a divisor and a reciprocal of said divisor in a division process, a multiplication for calculating a product of a dividend and a reciprocal of a divisor in a division process, or a multiplication for generating a partial quotient in a division process;

a multiplicand modulo 3 generator generating a modulo 3 equivalent of a multiplicand upon reception of said first mode signal;

a second mode signal indicating that multiplication under execution in said data processing apparatus is either said normal multiplication, said multiplication for calculating a product of a dividend and a reciprocal of a divisor in a division process, said multiplication for generating a partial quotient in a division process, or said multiplication for calculating a product of a divisor and a reciprocal of said divisor in a division process;

a result modulo 3 generator generating a modulo 3 equivalent of a multiplication result upon reception of said second mode signal;

a multiplier modulo 3 generator generating a module 3 equivalent of a multiplier;

a modulo 3 multiplier generating a modulo 3 equivalent of a product of a multiplicand modulo 3 generator's output and a multiplier modulo 3 generator's output;

a modulo 3 comparator detecting a bit error of the modulo 3 multiplier by comparing outputs of said modulo 3 multiplier and said result modulo 3 generator; and a control unit supplying said first mode signal to said multiplicand modulo 3 generator and said second mode signal to said result modulo 3 generator.

5. A system according to claim 4, wherein said multiplicand modulo 3 generator comprises a circuit generating a modulo 3 equivalent of a multiplicand upon reception of said first mode signal, and, when said first mode signal indicates either said normal multiplication, said multiplication for calculating a product of a divisor and a reciprocal of said divisor in a division process, or said multiplication for calculating a product of a dividend and a reciprocal of a divisor in a division process, said circuit directly generates said modulo 3 equivalent of said multiplicand, and, when said first mode signal indicates said multiplication for generating a partial quotient in a division process, said circuit adds said modulo 3 equivalent of said multiplicand to a constant determined by a precision of a reciprocal.

6. A system according to claim 4, wherein said result modulo 3 generator comprises a circuit generating a modulo 3 equivalent of an output from said multiplier, and, when said second mode signal indicates said multiplication for calculating a product of a dividend and a reciprocal of a divisor, or said multiplication for generating a partial quotient in a division process, said circuit directly generates said modulo 3 equivalent of said output from said multiplier, and, when said second mode signal indicates said multiplication for calculating a product of a divisor and a reciprocal of said divisor in a division process, adds said module 3 equivalent of said output from said multiplier to a constant determined by a precision of a reciprocal.

* * * * *

UNITED STATES PATENT AND TRADEMARK OFFICE
CERTIFICATE OF CORRECTION

PATENT NO. : 4,899,303
DATED : February 6, 1990
INVENTOR(S) : Masayuki KIMURA

It is certified that error appears in the above—identified patent and that said Letters Patent is hereby corrected as shown below:

Column 1, line 8, before "fault" insert --a--.

Column 1, line 8, before "multiplier" insert --a--.

Column 1, line 8, after "both" delete "a".

Column 1, line 9, after "and" delete "a".

Column 1, line 46, after "in" delete "a".

Column 2, line 53, "MB = mod3(MA + 1 + 1 + 2e + 8e)"
  should read --MB = mod3(MA + 1 + 1 + $2\bar{e}$ + 8e)--.

Column 2, line 61, "MB = mod3(MA + 2 + 2 + 7e + e)"
  should read --MB = mod3(MA + 2 + 2 + 7e + $\bar{e}$)--.

Column 4, line 14, after "hereinafter" insert a period
  --.--.

Column 6, line 45, after "and" insert a comma --,--.

Column 7, line 9, "ule" should read --ulo--.

Column 7, line 40, "module" should read --modulo--.

Column 8, line 38, "module" should read --modulo--.

Signed and Sealed this

Twenty-fifth Day of February, 1992

*Attest:*

HARRY F. MANBECK, JR.

*Attesting Officer*      *Commissioner of Patents and Trademarks*